(12) United States Patent
Hill et al.

(10) Patent No.: US 9,817,657 B2
(45) Date of Patent: Nov. 14, 2017

(54) INTEGRATED SOFTWARE DEVELOPMENT AND DEPLOYMENT ARCHITECTURE AND HIGH AVAILABILITY CLIENT-SERVER SYSTEMS GENERATED USING THE ARCHITECTURE

(71) Applicant: HARTIGEN SOLUTIONS, LLC., Houston, TX (US)

(72) Inventors: Anthony L. Hill, Spring, TX (US); Randal L. Frisbie, Lago Vista, TX (US); Eric John Moore, Houston, TX (US); Hubert S. King, Houston, TX (US); David B. Potts, Katy, TX (US)

(*) Notice: Subject to any disclaimer, the term of this patent is extended or adjusted under 35 U.S.C. 154(b) by 0 days.

(21) Appl. No.: 14/349,614

(22) PCT Filed: Oct. 5, 2012

(86) PCT No.: PCT/US2012/058961
§ 371 (c)(1),
(2) Date: Apr. 3, 2014

(87) PCT Pub. No.: WO2013/052801
PCT Pub. Date: Apr. 11, 2013

(65) Prior Publication Data
US 2014/0245262 A1    Aug. 28, 2014

Related U.S. Application Data

(60) Provisional application No. 61/543,503, filed on Oct. 5, 2011.

(51) Int. Cl.
*G06F 9/44* (2006.01)
*G06F 9/445* (2006.01)

(52) U.S. Cl.
CPC .................. *G06F 8/70* (2013.01); *G06F 8/30* (2013.01); *G06F 8/60* (2013.01)

(58) Field of Classification Search
None
See application file for complete search history.

(56) References Cited

U.S. PATENT DOCUMENTS 6,424,991 B1    7/2002  Gish
6,601,233 B1 *  7/2003  Underwood .............. G06F 8/24
                                                    717/100

(Continued)

OTHER PUBLICATIONS

Mocrosoft—Network Load Balanacing Technical Overview—2000, Located at https://msdn.microsoft.com/en-us/library/bb742455.aspx 2000.*

(Continued)

*Primary Examiner* — Wei Zhen
*Assistant Examiner* — Hossain Morshed
(74) *Attorney, Agent, or Firm* — Sage Patent Group

(57) ABSTRACT

An integrated software development and deployment architecture includes an application server/operating environment component that implements business intelligence to provide client-server based software solutions, a messaging component that connects the application server/operating environment component with client applications, and a rapid application development component that permits fast, efficient development of application software for deployment in the application server/operating environment using the integrated messaging component.

13 Claims, 11 Drawing Sheets

(56) References Cited

U.S. PATENT DOCUMENTS

| | | | |
|---|---|---|---|
| 7,389,510 B2* | 6/2008 | Forrester | G06F 9/505 709/223 |
| 2002/0161734 A1 | 10/2002 | Stauber et al. | |
| 2002/0198943 A1* | 12/2002 | Zhuang | H04L 29/06 709/206 |
| 2003/0220967 A1* | 11/2003 | Potter | H04L 67/10 709/203 |
| 2004/0015968 A1* | 1/2004 | Neiman | G06F 9/4843 718/100 |
| 2005/0086360 A1 | 4/2005 | Mamou et al. | |
| 2005/0114361 A1* | 5/2005 | Roberts | G06F 8/38 |
| 2006/0123383 A1* | 6/2006 | Apte | G06F 8/61 717/100 |
| 2006/0225032 A1* | 10/2006 | Klerk | G06Q 10/10 717/105 |
| 2007/0124363 A1* | 5/2007 | Lurie | G06F 9/5072 709/202 |
| 2007/0162912 A1* | 7/2007 | Kilian | G06F 9/5061 719/313 |
| 2007/0233870 A1* | 10/2007 | Goto | G06F 9/5033 709/226 |
| 2009/0106770 A1* | 4/2009 | Gan | H04L 51/38 719/313 |
| 2009/0157872 A1* | 6/2009 | Pinkston | G06F 9/546 709/224 |
| 2009/0281865 A1* | 11/2009 | Stoitsev | G06Q 10/06 705/7.22 |
| 2013/0132975 A1* | 5/2013 | Klemenz | G06Q 10/06 719/316 |
| 2014/0201729 A1* | 7/2014 | Smith | G06F 8/38 717/173 |
| 2014/0245262 A1* | 8/2014 | Hill | G06F 8/70 717/120 |

OTHER PUBLICATIONS

Friese, "Hot Service Deployment in an Ad Hoc Grid Environment", 2004, ACM, ICSOC'04, Nov. 15-19, 2004.*

International Search Report and the Written Opinion of the International Searching Authority corresponding to International Application No. PCT/US2012/058961; dated Dec. 11, 2012; 19 Pages.

* cited by examiner

INTEGRATED SOFTWARE DEVELOPMENT AND DEPLOYMENT ARCHITECTURE AND HIGH AVAILABILITY CLIENT-SERVER SYSTEMS GENERATED USING THE ARCHITECTURE

RELATED APPLICATIONS

This application is a 35 U.S.C. §371 national stage application of PCT Application No. PCT/US2012/058961, filed on Oct. 5, 2012, which claims the benefit of and priority to U.S. Provisional Patent Application No. 61/543,503, filed Oct. 5, 2011, entitled "Integrated Software Development and Deployment Architecture," the disclosures of which are hereby incorporated herein by reference in their entireties. The above-referenced PCT International Application was published in the English language as International Publication No. WO 2013/052801 A1 on Apr. 11, 2013.

BACKGROUND

The client/server model is a computing model that provides a distributed computing framework in which services are provided to by service providers called servers to service requesters, called clients. Tasks and workloads may be shared across multiple servers and may be accessed by multiple clients. Clients communicate with servers over a computer network, such as the internet, or over other computer communication systems, such as a local area network, a bus, etc. Although clients and servers typically reside on separate hardware, both the client and the server may reside in the same system in some cases. Typically, clients initiate communication sessions with servers by issuing requests to the servers. The servers process the request and return responses to the clients.

A client/server network typically involves multiple clients connecting to a single, central server. Client/server systems are typically suited to applications in which a number of clients need access to a centralized data store. A centralized data store can be more effectively managed by a single server or group of servers than by a large number of client applications. The file server on a client/server network may therefore have a robust hardware configuration to handle large volumes of client service requests. Servers are therefore typically high speed computers with a storage capacity.

A client/server development system is a development system used to create applications for a client/server environment. A comprehensive system generally includes a graphical user interface (GUI) builder for creating a user interface, a programming language for writing the business logic, an interpreter and/or compiler for generating executable code from the business logic, and debugging tools. A client/server development system typically provides support for a database management system and may also include software configuration management for version control and bug tracking. Accordingly, client/server development systems are typically oriented towards database management.

SUMMARY

An integrated software development and deployment architecture, including an application server component that implements business intelligence in the form of executable business objects that provide services to client applications, a messaging component that is configured to provide messaging services between the application server component and the client applications, and a rapid application development component that is configured to enable development of both client applications and business objects that are pre-configured to communicate using the messaging component.

The application server component may include an information service that communicates with the client applications and a host node service that communicates with the information service and manages operations of a host node on which the business objects are executed. The information service is configured to collect and distribute information regarding a condition of the host node, and the host node service is configured to control clustering of nodes into an environment.

The messaging component may include a message broker service configured to process messages transmitted between business objects and client applications and messages transmitted between host nodes.

The message broker service may be configured to receive a message from an endpoint, to store the received message in a persistent data store, and to create a message delivery queue entry in response to receiving the message. The message delivery queue entry identifies an intended recipient of the message.

The message broker service may be configured to determine if the message is intended for a local recipient that is in a same environment as the message broker or if the message is intended for a remote recipient that is in a different environment than the message broker, to notify the intended recipient of the message in response to determining that the intended recipient is in the same environment as the message broker, and to publish the message to a remote message broker service in response to determining that the intended recipient is in the different environment.

The host node service may further include an event manager service configured to control operation of the business objects in response to messages processed by the message broker service.

The message broker service may be configured to operate in a publish/subscribe model.

The host node service may further include a job manager service configured to manage execution of jobs by a business object in the host node. The host node may further include a job queue database that tracks active jobs being executed in a cluster of host nodes within an environment and that are managed by a plurality of job manager services within the environment. The job manager service may be configured to monitor the job queue database for notification of failure of another node within the cluster and to take over execution of a job that was managed by the failed node.

The job manager service may be configured to provide load balancing between host nodes operating in the environment by assigning jobs to host nodes within the environment based on respective utilization levels and process execution thresholds of the host nodes.

The business objects may be implemented using polymorphism and late binding.

The messaging component may provide built-in secure messaging for client applications and business objects developed using the rapid application development component.

Some embodiments provide a computer program product for providing an integrated software development and deployment architecture. The computer program product includes a computer readable storage medium having computer readable program code embodied in the medium. The computer readable program code includes computer readable application server program code configured to implement business intelligence in the form of executable business objects that provide services to client applications, computer readable messaging program code that is configured to provide messaging services between the application server component and the client applications, and computer readable rapid application development program code that is configured to enable development of both client applications and business objects that are pre-configured to communicate using the messaging component.

It is noted that aspects of the inventive concepts described with respect to one embodiment may be incorporated in a different embodiments although not specifically described relative thereto. That is, all embodiments and/or features of any embodiments can be combined in any way and/or combination. These and other objects and/or aspects of the present inventive concepts are explained in detail in the specification set forth below.

Other systems, methods, and/or computer program products will be or become apparent to one with skill in the art upon review of the following drawings and detailed description. It is intended that all such additional systems, methods, and/or computer program products be included within this description, be within the scope of the present inventive concepts, and be protected by the accompanying claims.

DETAILED DESCRIPTION

Figure 1:
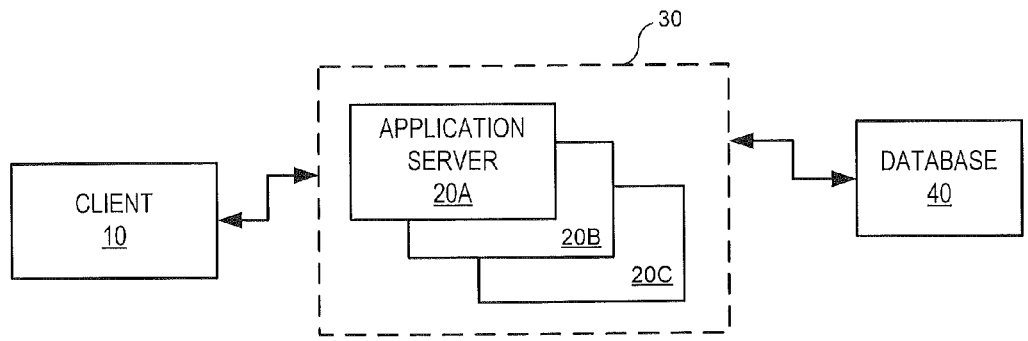
FIG. 1 illustrates a general form of a client-server system according to some embodiments.

An integrated software development and deployment architecture according to some embodiments includes an application server/operating environment component that implements business intelligence to provide client-server based software solutions, a messaging component that connects the application server/operating environment component with client applications, and a rapid application development component that permits fast, efficient development of application software for deployment in the application server/operating environment using the integrated messaging component.

Integrating the application server/operating environment component, the messaging component, and the rapid application development component can enable rapid development and deployment of client-server based software solutions in a manner that makes the solutions both robust (in terms of system availability and/or reliability) and scalable.

In addition, because the rapid application development component is integrated with the application server/operating environment component, it may be possible for the rapid application development component to generate compileable code, rather than code fragments or stubs, that can be deployed more quickly than may be possible with non-integrated systems.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

I. Client/Server System Architecture Overview

A general form of a client-server system 100 that may be configured according to some embodiments is illustrated in FIG. 1.

In the system 100 shown in FIG. 1, a client 10 obtains services from a cluster 30 of application servers 20A, 20B, 20C. The application servers 20A, 20B, 20C can be clustered to provide reliability and/or scalability. In particular, in some embodiments application servers 20A, 20B, 20C can be dynamically added or removed from the cluster 30 as necessary to meet changing demands. A cluster of servers 20A, 20B, 20C that are bound together to provide a specific set of services is referred to herein as an "environment."

The application servers 20A, 20B, 20C execute business objects, which provide services to the client 10. As will be discussed in more detail below, the business objects may include compiled code in the form of dynamic link libraries (.dlls) that embody business intelligence or business logic, and may be generated by a rapid application development component using data stored in the database 40 in combination with user-defined code generation templates. Business intelligence is specific to the particular solution that is being implemented and includes, for example, proprietary methods and/or algorithms for processing specific types of data.

Application code can be generated by the rapid application development component in a manner that allows the code to be executed by any application server 20A, 20B, 20C that is compliant with the integrated architecture of the present invention. The application code can therefore be generated without regard to the particular hardware on which the application server is deployed, making the system more flexible and/or scalable.

Although various development tools, such as Microsoft .NET, Microsoft Azure, Amazon Cloud, and others have been developed, an integrated development and deployment suite according to some embodiments can provide certain benefits that cannot be easily obtained by implementing these components separately, as discussed in more detail below.

Figure 2:
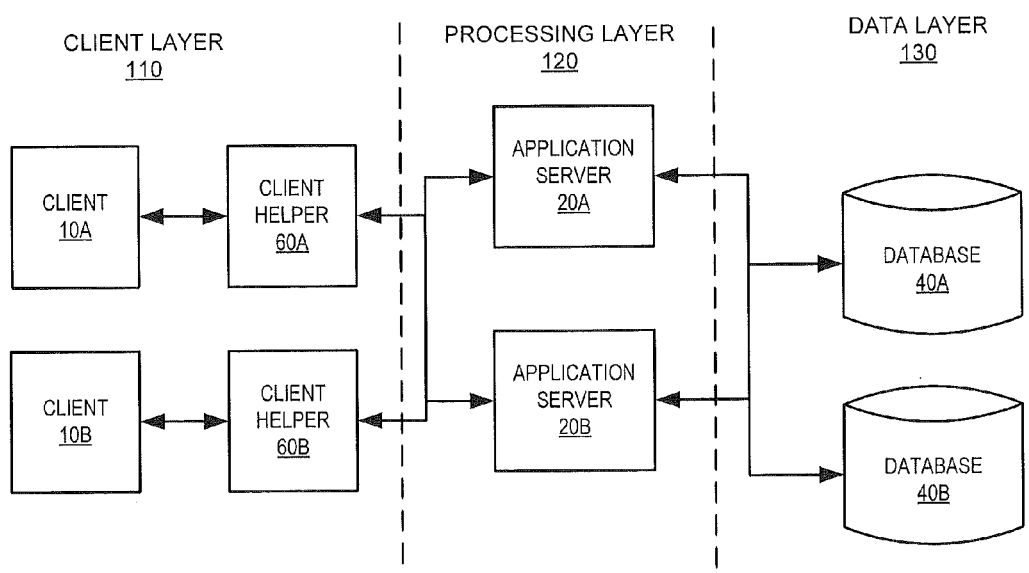
FIG. 2 illustrates further aspects of a client-server system according to some embodiments

Referring to FIG. 2, a client-server system 100 according to some embodiments is arranged in an n-tier solution model, which utilizes two or three specific tiers, namely, a client layer 110, a processing layer 120, and a data layer 130.

The client layer 110, or "presentation layer," is embodied on client nodes 10A, 10B and provides users of the system an interface to the data and or functionality that resides in the processing layer 120 and/or the data layer 130. Client helper applications 60A, 60B may provide connectivity between the client nodes 10A, 10B and the processing layer 120.

The processing layer 120 or "application layer," is responsible for executing business intelligence on the data obtained from the data layer 130. The processing layer 120 comprises application servers 20A, 20B that hosts business objects 22 as well as software services 24 that provide for common functions such as solution clustering and load balancing.

The data layer 130 includes one or more databases 40A, 40B that store and indexes business data that is managed by the system. The data may be stored in a relational database management system, such as an SQL Server, or a non-relational database depending on the nature of the data. The level of business intelligence embedded into the data layer is specific to each solution.

As noted above, an "environment" refers to a collection of Nodes running within a cluster. Each cluster may have a unique name, or environment, designation. This unique reference is how Nodes join and manage the cluster. By clustering nodes in unique environments, a system according to some embodiments may have multiple versions of the platform cohabitate within a single node. So long as the installation is configured using a unique environment designation, a single node may be a part of multiple environments.

II. Integrated Software Development And Deployment Architecture Overview

An integrated software development and deployment architecture according to some embodiments provides a collection of tools that, when used together, may expedite the development and/or deployment of custom software. Moreover, an integrated software development and deployment architecture according to some embodiments may advantageously decouple the software architecture from the business intelligence that is used to generate business objects, which may make a client-server system generated using the integrated software development and deployment architecture more flexible, scalable and/or reliable.

Figure 3:
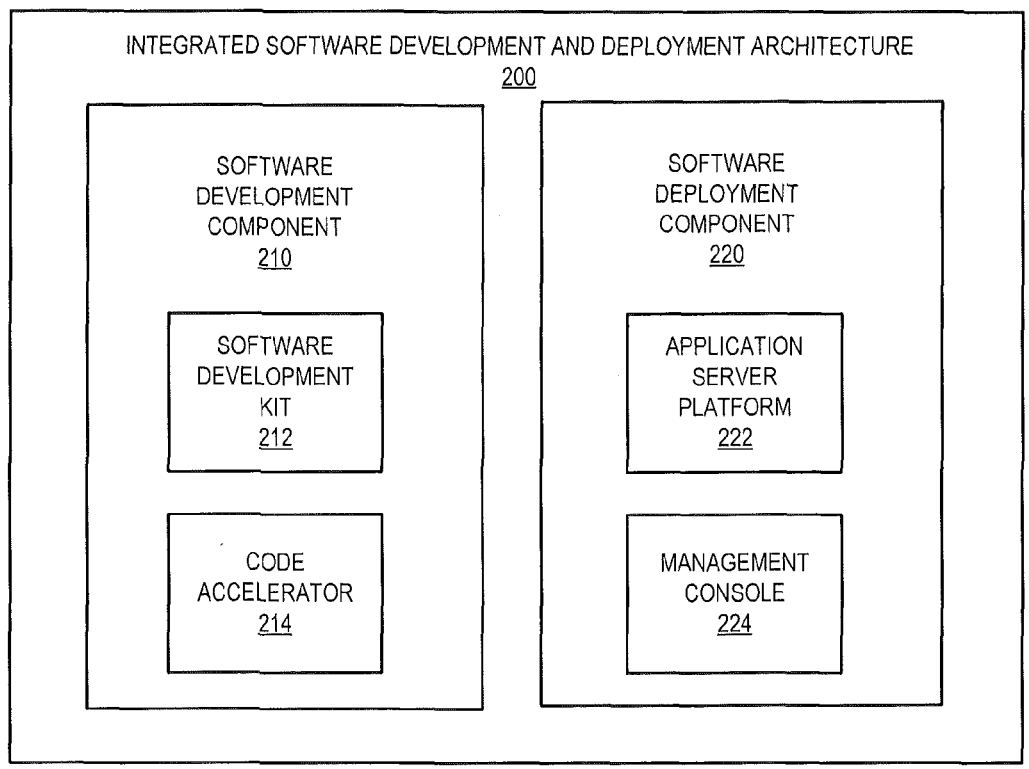
FIG. 3 illustrates an integrated software development and deployment architecture according to some embodiments

Referring to FIG. 3, an integrated software development and deployment architecture 200 according to some embodiments may include a software development component 210 and a software deployment component 220. The software development component 210 may include a software development kit 212 and a code accelerator 214. The software deployment component 220 may include an application server platform 222 and a management console 224. A user of the integrated software development and deployment architecture 200 may use these components, which are described in more detail below, to rapidly develop custom software solutions that have a high level of reliability, portability and/or scalability.

Within the software deployment component 220, the application server platform 222 component of the software deployment component 220 provides a pre-built platform for implementing business objects. In addition to implementing business objects, the application server platform 222 implements ancillary services, such as information services, host node services, message brokers and event managers which provide business continuity, performance, security, job management, workflow management and a messaging bus. These services support the plug and play deployment of business logic through business objects.

The management console 224 is an administrative program that allows a user to configure and manage a deployed system. For example, the management console 224 enables a user to start and stop environments, deploy business objects, etc.

Within the software development component 210, the Software Development Kit (SDK) 212 includes the components necessary to build custom software components that interact with system nodes. For example, the SDK 212 includes the reference libraries needed to build business objects, to communicate with a system environment etc.

The code accelerator 214 is a tool that can be used to produce custom software libraries (business objects) to be deployed within the application server platform 222.

As used herein, the term "node" refers to any computer with client or application services of the present integrated development and deployment system installed thereon. A "client" is a node that interacts with a clustered environment to gain access to data functions provided by the environment.

All communications between components may be performed using the TCP/IP protocol, rather than the widely adopted and used HTTP and SOAP design patterns. Microsoft's Windows Communication Framework may be used to implement the communication channels and manage socket state.

III. Component Overview

A. Application Server Platform

The application server platform is a service-based server architecture that can provide cloud-based services, clustered application server environments and/or act as a message bus for data integration.

In particular, the application server platform provides an operable server technology including fundamental functions and architecture that supports high availability standards, provides performance and scalability through localized grid-computing concepts, while also ensuring data security and integrity. In addition, the services that are used to provide this server technology can also be implemented to accomplish data integration between disparate business systems by acting as a message bus.

Figure 4:
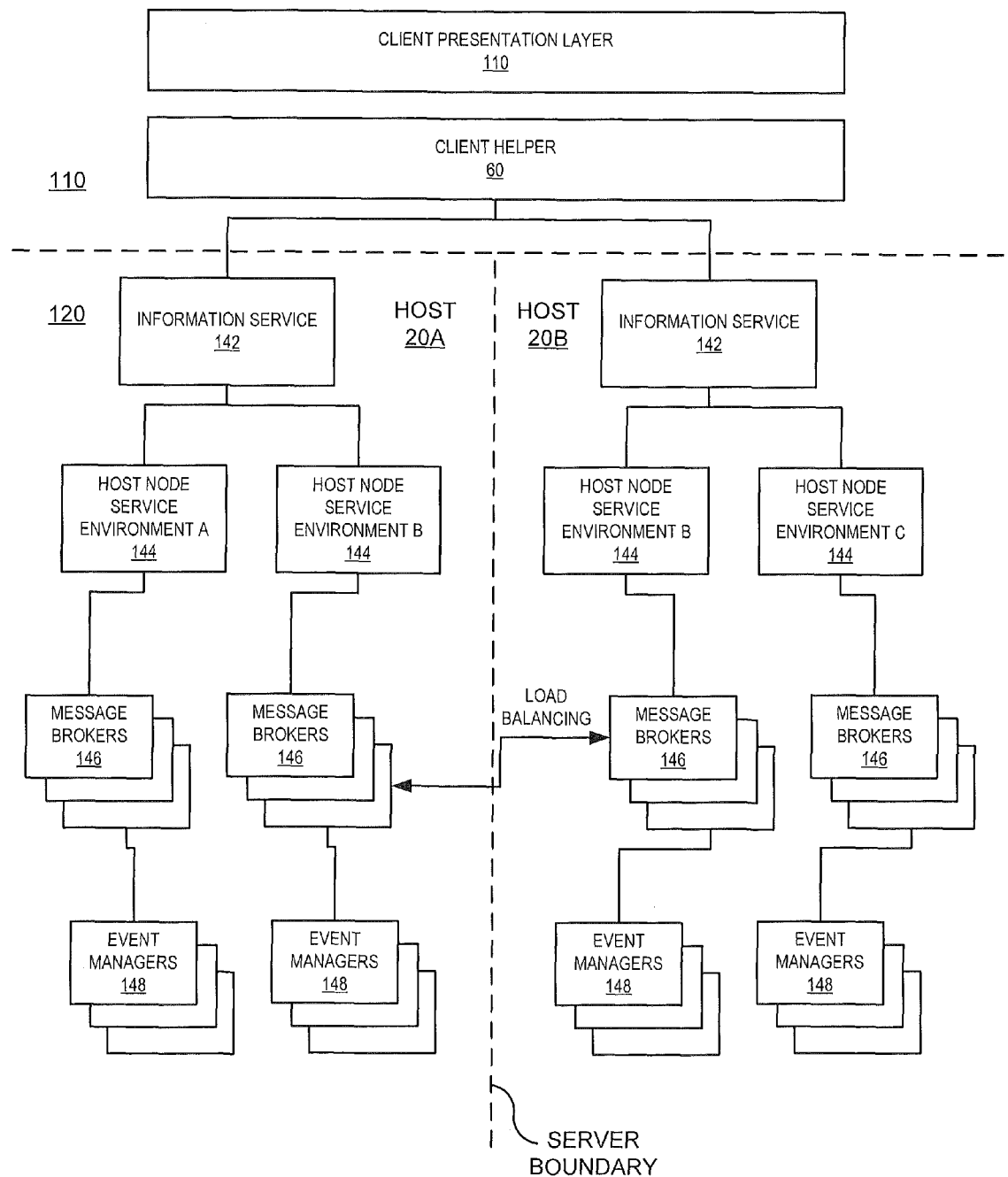
FIG. 4 illustrates the relationship between the presentation layer (client layer) and the processing layer in a client-server system according to some embodiments.

FIG. 4 illustrates the relationship between the presentation layer (client layer) and the processing layer 120. A client helper 60 provides access to a clustered environment including two hosts, or application servers 20A, 20B. As shown therein, the client presentation layer 110 may access services on one or more application server platforms 20A, 20B through a client helper application 60 that resides outside the application layer.

Each application server platform implements a number of services, including information services 142, host node services 144, message brokers 146 an event managers 148. These services are described in detail below.

Primarily, the application server platform exists to provide clients access to proprietary business intelligence through business objects that are executed by the application server platform. In connection with this, the application server platform creates, schedules and executes jobs that access functionality contained within business objects.

In addition, the application server platform may provide a secure messaging bus capable of passing information to and from various system components. In addition, the application server platform may provide a persistent messaging system that protects against data loss during failure scenarios. The security and stability of the messaging system may help make the present architecture a suitable option as a cloud deployment platform for software and services.

The application server platform may also enable clustering of server technologies with the ability to self-manage the clusters during emergency scenarios—e.g. provide intrinsic fail-over and fail-back functionality. This may provide high availability of application services in a cost effective manner with out-of-the-box support for business continuity and disaster recovery.

The application server platform may also perform load balance processing across the cluster to make efficient use of the nodes that are within the cluster. Load balancing can provide processing efficiency and scalability through load distribution across the cluster.

The application server platform may also manage process workflow through the linking of jobs and their success or failure.

B. Management Console

Environments (i.e., clusters) can be configured and managed through the use of a graphical user interface (GUI) based management console. The management console provides access to the advanced features and functionality that is used to configure, manage and maintain a cluster.

The per-service and per-component configurations that are necessary to take advantage of the flexibility of the system are abstracted into a graphical representation of the elements being managed.

Figure 5:
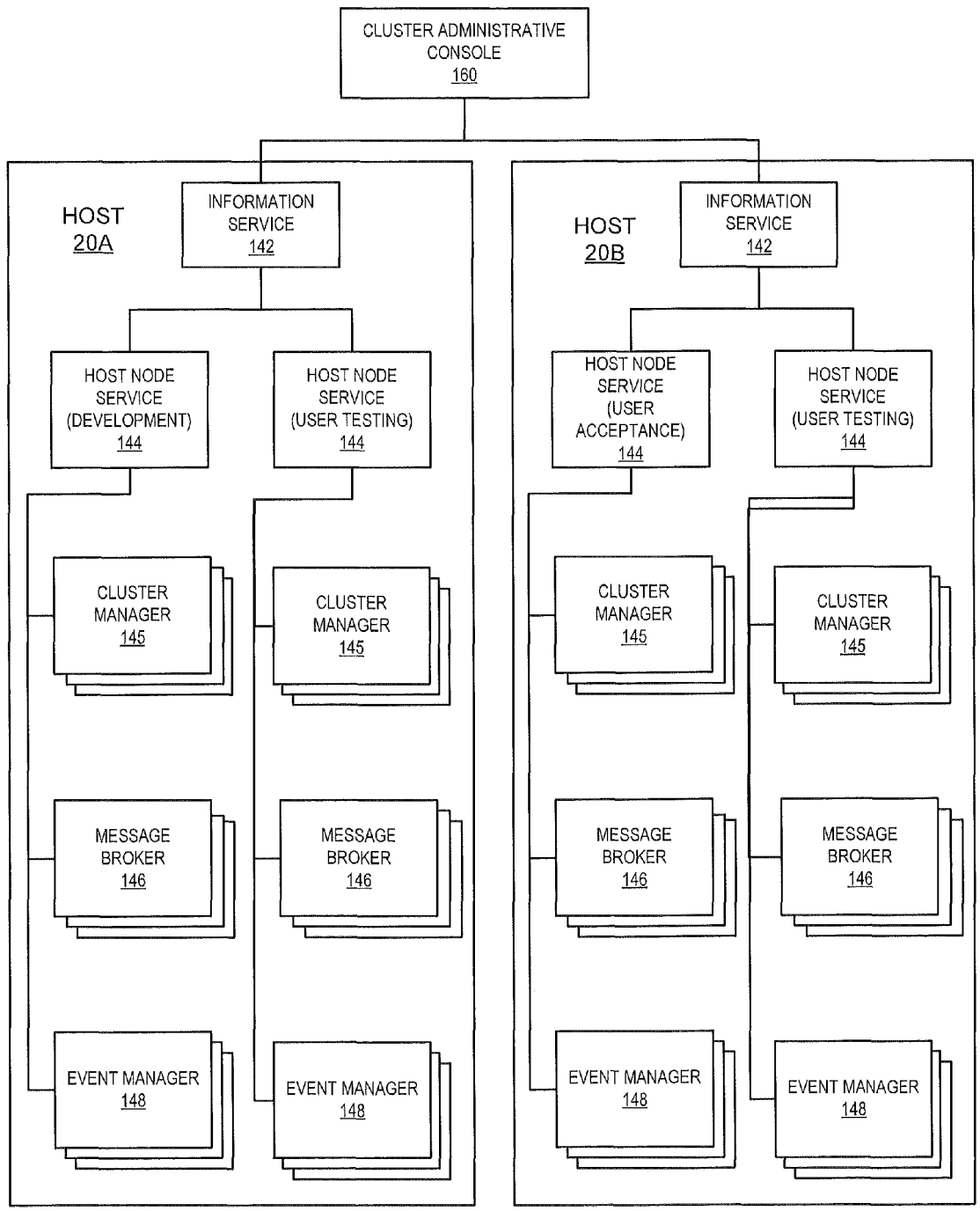
FIG. 5 illustrates the relationship between the management console and the services running on each node running within an environment in a client-server system according to some embodiments.

The relationship between the management console and the services running on each Node running within an environment are illustrated in FIG. 5. As shown therein, a management console 160 communicates with the information service component 142 of a managed host 20A, 20B.

The management console provides core functionality to create environments, including adding or removing nodes from a cluster, to start, stop and restart environments, and to manage business object deployment on running environments.

The management console may further monitor real-time statistics and metrics of each Node in an environment through graphical displays. In addition, the management console may access log and trace information for each service running on each node. The management console provides a single tool that drastically simplifies management and maintenance of environments.

C. Software Development Kit

The Software Development Kit is a set of compiled libraries (*.dll) which aid in the development of client applications and business objects. The libraries encapsulate and abstract the complexity of interfacing with a multi-node cluster of services.

The Software Development Kit provides software developers with a set of objects and methods which provide robust access to the functionality provided by application servers. These objects provide the ability to write client applications, message listeners and business objects.

The Software Development Kit may include the following libraries:

LSCommon.dll—this library encapsulates the most commonly used methods and objects that are used to make function calls to system components.

LSBusinesObjectWrapper.dll—this library is a wrapper class that is used to provide a common interface to customer class libraries that contain proprietary business intelligence that will be deployed to an environment as a callable business object.

LSClientHelper.dll—this library contains the objects and methods used to communicate with an environment either by calling a business object, publishing a message or subscribing to and receiving a published message.

LSTemplateWrapper.dll—this library is a wrapper class that is used to generate template libraries for use in the Code Accelerator.

The software development kit provides developers the ability to write objects that connect and register with an environment either as a client, a publisher or a subscriber, and that invoke methods made available with a business object that is deployed within the environment or publish or subscribe to messages.

D. Code Accelerator

The code accelerator is tool that uses pre-defined templates containing coding design patters to programmatically generate well-formed source code that can be compiled and deployed to an environment. The tool utilizes relational models between objects to generate source code. The exact code that is generated from the relational model is purely driven by the templates and is not dictated by the tool itself.

The code accelerator may be used to automate the process of building software components that take action on data (e.g. New, Edit and Delete). In addition, by acknowledging a relational model, the templates may be written with intelligence to handle relationships between objects. The tool does not distinguish between the type of code it is creating through use of the template, meaning it is capable of creating code libraries and executable programs.

In operation, the code accelerator loads a relational data model and provides developers with a graphical user interface to change properties and relationships that will be taken into consideration during code generation. This process can be used to develop custom proprietary templates that can be used for custom code generation. This may dramatically speed the process of developing both client applications and business objects that can be deployed in a system according to some embodiments.

The code accelerator may be implemented as a Microsoft .NET tool, which assists in the rapid development of data-driven solutions by programmatically creating compile-ready solution libraries and projects.

This is accomplished by leveraging a relational data model and Microsoft T4 Templates to programmatically generate working code from design templates.

A number of relational models may be supported by the tool, including Database Schemas, Oracle, SQL Server, MySQL, and/or XML Schemas (XSD).

IV. Application Server Platform Service Descriptions

The application server platform operates a number of services, each of which is responsible for a specific function within the system. For example, the application server platform operates an information service, a host node service, a message broker service, an event manager service and a job manager service.

The information service is the base service that identifies a node within a cluster. It provides information such as the host name and performance data used to provide metrics that drive load balancing decisions.

The host node service is the operational service that manages connectivity and registration of the node within its cluster. Clusters are segregated by a unique name, effectively creating an environment of clustered nodes.

The message broker service is responsible for managing data communications between clients, event managers, message brokers and host node services running within the same cluster. In addition to management of communications, the message brokers also process load balancing if a business object is being called within the application server platform.

The message broker service further provides a single endpoint for all interactions with the platform. The message broker service may implement three generic methods (Fetch, Update, and Delete) to handle any data object within the system. This allows integrations to use the same integration technology to retrieve or update any object within the system. The technology rapidly decreases development time by automatically exposing to clients any data formatted according to the HTTP or TCP protocols that is added to the system. No additional services layer coding is required for each data type as is typical in most service oriented architecture applications. In addition, this technology supports additional platforms such as mobile devices.

The event manager service is responsible for executing functions within business objects and, in the case of a synchronous communication, the return of the function would then be sent back.

The job manager service is responsible for the scheduled invocation of methods contained within business objects deployed within an environment. Job Schedules may be created through reoccurrence or through workflow triggers and are read from a persisted queue. More complex work flows may be created by linking jobs together to run synchronously or asynchronously depending on success or failure conditions.

The information service, host node service and message brokers combine to make an application server according to some embodiments a high availability platform. If one processing node goes offline due to an interruption, all traffic can be redirected to the available processing nodes without any human interaction. The high availability approach is a passive model in which the node can be offline for an unspecific amount of time before the failover occurs. There is not regularly scheduled health monitoring event (i.e., "heartbeat") transmitted between the nodes in the cluster to determine if a component of a system is available, thus reducing network load in the environment. Rather if an endpoint on a node fails to open within a predetermined time period (e.g. 5 seconds) in response to a request, the node will be identified as offline and all endpoints are removed from a cluster registry maintained in the cluster administrative console. When the node comes back online, it rejoins the cluster and is available for process execution.

A byproduct of this capability provides a mechanism for upgrading the environment and solution running on the system without bringing the entire system down for the upgrade.

1. Information Service

The information service is responsible for gathering the information on the health of the host server and providing information to the cluster administrative console of the various environment host node services running on the host.

The primary purpose of the information service is to capture real-time statistics on the overall health of the host. There may only be one instance of the information service running on a host. The information service has the ability to start and stop a specific environment's host node service through a service endpoint, such as a Windows Communication Foundation (WCF) endpoint, consumed by the cluster admin console.

The health of the host is stored in a persistent storage by the service and recalled on demand to the cluster administrative Console application via a WCF Service endpoint. The service may be responsible for recording host health information, such as CPU Usage, Disk I/O, RAM Usage, the number of environments running, the number of threads executing, the number of processes running on the host, etc.

The information service contains a configuration file containing the information for each installed environment's host node service. When the host node services are installed and started for the first time, the service endpoint port and environment name are added by the host node service into the environment configuration file that is read by the information service. When the cluster admin console requests information about the host, this file is read into memory and returned to the cluster admin console. When the information service is installed, the file is generated with the appropriate name.

An example of an environment Configuration File is <HostConfiguration EndpointAddressFormat="net.tcp://{0}:{1}/ls" Name="ls"> <Host Environment="Development" Version="v1.0.0.1" TCPport="5001" HTTPport="5002"/> <Host Environment="User Test" Version="v1.0.0.2" TCPport="5001" HTTPport="5002"/> </HostConfiguration>

The host service endpoint will be consumed by the cluster admin console component to communicate with the Information Service. The cluster admin console may be the sole consumer of the information service.

The information servide interface may define the following calls:

GetHostConfiguration—Synchronous call to get the instance information for each host node service running on the specific host.

GetHostHealth—Synchronous call to get the overall status of a host.

ActionHostNode—Asynchronous call to send an action to a environment's host node service. The actions can be start, stop, or restart the service.

AddHostToEnvironment—Synchronous call to instantiate a host node service on the specified Host Node to join a specific environment. The Primary Host is required as an argument to the call to start the host node service.

RemoveHostFromEnvironment—Synchronous call to remove a Host Node from a specific Environment.

The consuming application can request the host statistics or send messages to stop, start, or restart entire environments on the host, and add/remove hosts from an environment. The ports for the information service may be defined in the application configuration file.

The URI for each endpoint may be dynamically generated based on the configuration file parameters or instance arguments as follows:

http://{0}:{1}/ls/informationservice
net.tcp://{0}:{1}/Is/informationservice where 0=Service DNS host name and 1=Port number 2. Host Node Service The host node service is responsible for starting, stopping, and restarting the cluster services that reside on a specific host. A host in a distributed cluster can have multiple host node services installed to support multiple environments.

The purpose of the host node service is to start up the node instances on the local host and to monitor the health of the nodes running on the physical host in the distributed cluster. The host node cluster has the ability to spawn additional nodes, shutdown nodes, or kill nodes when directed by the cluster admin console.

The host can support multiple environment installations in the present architecture. The location of the node applications and cluster registry is based on the relative path to the host node service. This configuration may support multiple version of the code base running side by side on the host, with each installation segregated by environment. Each installation of the host node service may record its port and environment information with an Information Service configuration registry.

(a) Cluster Configuration

The host node service application config file contains the number of each node type as well as the seeded port number to launch on the specific host. In some embodiments, a minimum of three of each type of node application may be launched to support a high availability service model. During runtime, the configuration can be changed through the cluster admin console.

Application Configuration Settings

The application configuration settings may be as shown in Table 1 below.

TABLE 1

Application Configuration Settings

| Settings | Description |
| --- | --- |
| Environment | States the environment of the installation. |
| WellKnownHTTPPort | The port number for the WCF Service Endpoint used by the Information Service. |
| WellKnownTCPPort | The port number for the WCF Service Endpoint used by the Information Service. |

TABLE 1-continued

Application Configuration Settings

| Settings | Description |
| --- | --- |
| ClusterManager_Number | The number of Cluster Manager nodes to launch at start up. The minimum is three. |
| ClusterManager_PortSeed | The initial seed for the range of port numbers for the Cluster Managers. |
| MessageBroker_Number | The number of message broker nodes to launch at start up. The minimum is three. |
| MessageBroker_PortSeed | The initial seed for the range of port numbers for the message brokers. |
| EventManager_Number | The number of event manager nodes to launch at start up. The minimum is three. |
| EventManager_PortSeed | The initial seed for the range of port numbers for the event managers. |
| IsPrimary | Flag to determine if the host is supposed to launch the initial Primary Cluster Manager. If the primary goes offline, the next in order for the host will reclaim role as primary. If the host is offline, a Cluster Manager on another host will reclaim the role as Primary Cluster Manager until the primary host is back online. |
| Process_Number | The threshold for each instance for the number of concurrent processes to run. |
| CreateNoWindow | Flag to show or hide the console application. |
| UseShellExecute | Flag to show or hide the console application. |
| RedirectStandardOutput | Flag to direct the output of the console applications to the console window. |

(b) Cluster Startup

At cluster startup, the host node service generates the unique node for each instance of a node application. In addition, the seeded port number will be tested through a TCP socket to ensure it is not in use before passing the Guid and Port numbers through arguments to the starting process.

(c) Primary Cluster Manager

Even though the nodes can be started in any order, a cluster Manager will be started first followed by a 10 second delay. This will allow the host node to reclaim its role as primary cluster manager if needed. The remaining nodes will all start without any delay. If the host configuration identifies the host as the primary, an instance of the cluster Manager is started with an argument stating it is primary to trigger the reclaim role as primary process.

The host node service starts the node application and passes it a specific set of arguments, including, for example, Guid, Port, Environment, Process Number, lsPrimary and/or cluster registry.

The cluster registry may only contain the information for the nodes that are currently online across all hosts in the defined environment.

The cluster registry may be regenerated by the primary cluster manager when the node topology is changed. When new nodes come online, they may register with the primary cluster manager, which in turn updates the cluster registry. When the primary cluster manager's health check determines that a node in the cluster is no longer available, the entry is removed from the cluster registry. In addition, the primary cluster manager will notify the first available Secondary cluster Managers in each host within the cluster environment so a secondary host will have an updated copy of the cluster registry.

Any changes to the node topology will trigger a push of the in memory cluster registry to all nodes in the cluster. The cluster Managers, message brokers, and event managers will all receive a new copy of the in memory cluster registry from the primary cluster manager.

(d) New Host Registry

The cluster administrative console (or "cluster admin console") is responsible for adding new hosts to an environment cluster. When a new host is added to an environment, the implementation for the service host is added to the host configuration through the information service. The cluster admin console sends startup arguments to the Information Service with the primary host name for the environment. When the information service starts the host node service, it will send the primary host information through so the service can contact the primary host information service to obtain the latest cluster registry for the environment. Once the host node service obtains the latest copy of the cluster registry and saves it to disk, the nodes are started and can register with the primary cluster manager.

(e) Host Node Service

The host node service is associated with an admin service endpoint that is consumed by the cluster admin console component to communicate the node status and availability to the cluster admin console.

The host node service uses an AdminService interface that includes the following calls:

GetNodeStatus—A synchronous call to get the status of a specific node on the host passed through to the primary cluster manager.

ActionSingleNode—An asynchronous call to send an action to a specific node. The actions can be start, stop, restart, and kill. Shutdown and Kill command are sent to primary cluster manager.

ActionAllNodes—An asynchronous call to send an action to all nodes. The actions can be start, stop, restart, kill. Shutdown and Kill command are sent to primary cluster manager.

Registerinstance—A synchronous call that installs and registers a new instance of a node.

Unregisterinstance—A synchronous call that unregisters and deleted an existing instance of a node.

The Admin Console may connect to the Information Service through a specified port and net.tcp endpoint URI. The administration console may issue the following commands, which the Information Service will execute directly:

Authenticate itself with the system

Request host performance metrics (e.g., CPU utilization, # of processes running, amount of memory available, the number of threads that are running, etc.).

Stop a Service Host on a host node

Start a Service Host on a host node

Restart a service host on a host node

A number of commands are delegated to the service host for interaction with the components, including:

Request the cluster registry file for a given environment. The cluster registry is a file that identifies every environment running on the host, every host that running in that environment, and the components that the hosts are running, including cluster managers, message brokers, and event managers.

Request component performance metrics by Guid, or by environment

Request the component configuration information by Guid or by environment (so an operator can see exactly how the components running on the host are configured from a central location, such as the administration console)

Kill an instance of a running component by Guid (f) New Node Registration

During the registration process, the cluster admin console sends a message to the appropriate host node service where the new node is to be registered. The host node service will create a new instance of the node, generate the Guid and port numbers. Once the new instance is setup, the host node service will contact the primary cluster manager to complete the registration process.

The URI for each endpoint may be dynamically generated based on the configuration file parameters or instance arguments.

http://{0}:{1}/ls/hostnodeservice/{2}
net.tcp://{0}:{1}/Is/hostnodeservice/{2} where 0=Service DNS host name, 1=Port number and 2=Environment

3. Message Broker Service

Message Broker—The single external facing endpoint for the presentation layer developed using Windows Communication Foundation. The message broker supports a wide variety of client applications for an extended User Experience (UX).

The message broker provides the transport channel for messages from the UX to the application server. This component will reside on each of the application servers and reachable using the WS Discovery protocol via an address. The transport channel will have state (Per Session Pattern) and provide for transactional and callback support.

The message broker includes client facing interfaces that are consumed by various client applications in the presentation layer.

The IClient Interface includes the following calls:

GetNextA vailableNode—Synchronous call to get the next available node to a client session to bind.

InitializeSession—Allows the service in session mode to connect to a cluster manager for future calls. Session state must be maintained for the client for improved performance.

MessageSend—Synchronous method for clients to send message updates to the application layer for processing.

MessageSendAsync—Asynchronous method for clients to send messages to the application layer. The MessageResultCallback is invoked on the client once the message is processes.

MessageRequest—Asynchronous method for clients to request large amounts of data from the application layer back to the client for display. Large amounts of data can be streamed back to the client using multiple channels.

StatusCallback—Callback message which provides ability of the application layer to send notifications to the client.

MessageResultCallback—Callback message which returns the results back to the client from the MessageSendAsync method.

Any client application written in the presentation layer may be a consumer of this component. The presentation layer will have a web application that will allow for a TCP binding method for premium performance across the domain boundaries when sending large amounts of data to be processed.

A one-way message pattern may be used for the MessageSend method for sending messages with large amounts of data to the application layer for processing. This asynchronous call allows the client thread to continue without any interruption of hesitation in the UX. The MessageCallback in the duplex message exchange will be used to notify the client of any issues in processing or status updates. The sending of the message can also be in a streamed mode.

A Streaming Pattern may be used for the MessageRequest method when the client is requesting a large amount of data from the application server for display. The pattern does not provide for a callback since this will be already provided by the Duplex Message Exchange Pattern.

Each interface may have both an HTTP and TCP endpoint. The URI for each endpoint may be dynamically generated based on the configuration file parameters or instance arguments as follows:

http://{0}:{2}/discovery/messagebroker/{1}/
net.tcp://{0}:{2}/discovery/messagebroker/{1}/
where 0=Service DNS host name, 1=Instance Guid and 2=Port number 4. Event Manager Service The event manager service is an internal facing endpoint in the application layer between the message broker and data stores developed using Windows Communication Foundation.

The event manager processes the messages saved in the message queue by the message broker. The event manager processes the messages by invoking the appropriate business object and returns a result set back to the message broker.

The event manager has a broker service endpoint that is consumed by the message broker component to communicate and facilitate the processing of messages in the message queue.

The IBroker2Service interface has the following calls:

SendMessageGuid—Sends the unique Guid identifying the message in the Message Queue to be processed.

ProcessingStatus—Callback to the message broker to report on the status of message processing by the event manager and business objects.

The message broker services may be the only consumer of the IBrokerService interface via a TCP binding method for premium performance across the domain boundaries when sending large amounts of data to be processed.

A Streaming Pattern is used for the SendMessageID method when the MessageBroker is requesting a large amount of data from the application server to return to the client. The pattern does not provide for a callback since this will be already provided by the Callback Pattern.

A Callback Pattern is used for the ProcessingStatus method with the event manager needs to return status messages back to the message broker.

The behavior of the internal facing interface is Discovery and the ContextMode is Per Session to allow for Callbacks. Each interface may have both an HTTP and TCP endpoint.

The URI for each endpoint is dynamically generated based on the configuration file parameters or instance arguments as follows:

http://{0}:{2}/discovery/eventmanager/{1}/
net.tcp://{0}:{2}/discovery/eventmanager/{1}/
where 0=Service DNS host name, 1=Instance Guid and 2=Port number 5. Job Manager Service The job manager service provides the present system with the ability to schedule tasks for execution at a later date and time. These tasks can either be a one-time run or a reoccurring task. The scheduling of tasks may be based off of, for example, calendar scheduling functionality, as the primary objective of the job manager is to provide an intuitive methodology for scheduling and executing jobs within the architecture.

The job manager leverages a message queue table that mimics the queue/message structure used by the message broker. The key differences in the schema are the fields that allow for scheduling the execution. The job manager polls this table looking for jobs that require execution.

Once a job is found, the job manager submits the tasks into the architecture for execution using normal channels; e.g. will create a message and submit it through to a message broker.

There can be multiple job managers running at the same time processing jobs. Each job manager continually monitoirs the LSQUEUE database to determine what tasks are in queue and whether or not each task is currently being executed. When a job manager identifies a task in the LSQUEUE database that is pending and not currently being executed, the job manager may take control of the task and cause it to be executed. When a job manager takes over a task, an entry is made in the LSQUEUE database indicating that the job is being executed.

This approach may facilitate high availability of the job processing. In particular, the job manager may recover pending jobs if a service or server goes offline while processing a job.

For example, if Job Manager A is processing Job 1, 2, and 3, the jobs are notated in the LSQUEUE database as being processed by Job Manager A. However, if Job Manager A suddenly crashes or otherwise ceases processing the jobs, a process lock mechanism in the LSQUEUE database can release the jobs. A second job manager, e.g. Job Manager B, monitoring the LSQUEUE can pick up the released jobs for processing.

In particular, when a job status has not been updated in a specified amount of time, the LSQUEUE database may assume that the associated job manager has crashed, and may release the job from the previous job manager. Another job manager can then take control of the released job and complete it.

The above-described technique provides a passive approach to high availability in a server system. There is not a "heartbeat" transmitted between all job managers running in the cluster (i.e. the job managers do not communicate their status directly to one another).

A job is made up of multiple tasks; each task's logic is contained within a business object running within the architecture.

Jobs can have a single task or many, and Jobs can have reoccurrence or be configured for a one-time run.

Tasks within a job may be ordered to build a workflow. Task attributes will determine the order to be run and whether the task should halt the entire job on failure.

Notifications may be triggered at both the job and task level by email.

Remote method calls using business objects or non-solution accessible web methods can be configured at the job level. This functionality is also available at the task level through ordering (workflow).

The job manager service monitors the LSQUEUE table for jobs that are due for execution. The polling interval can be modified using the application configuration parameters.

JobHelper Component

The JobHelper library is a lightweight class that provides access to Job and Task creation and management, and it is used to assist solution development that requires access to Job Management functions.

The JobHelper library provides functionality of creating new Jobs and Tasks and managing existing Jobs and Tasks within the system.

The following tables are used by the JobHelper:

JMQUEUE

The JMQUEUE queue table will handle both single task and multi-task jobs and defines the reoccurrence, if any, which should occur. Upon execution of the JMQUEUE record and sub-tasks located in the JMMSG table, the status will be updated appropriately (Success/Failure). If there is a reoccurrence for the job, a new record will be written to the table with the exact same values, except the EXEC_DT will be the next time the job should execute according to the reoccurrence information; additionally, all tasks located in the JMMSG table are re-written using the same approach.

The JMMSG message table holds the instruction to be executed as part of the job. This structure mimics the QUEUE table used by the message broker component of the system and holds the Message that defines the instruction to be executed by the system.

The ROCCR table holds the reoccurrence types supported by the Job Manager. This table exists for the purpose of creating an integer based index on the JMQUEUE table to speed queries. These values may include, for example, MNTHLY—Monthly, WKLY—Weekly, DLY—Daily, HRLY—Hourly, SNGL—Single occurrence, etc.

Figure 6:
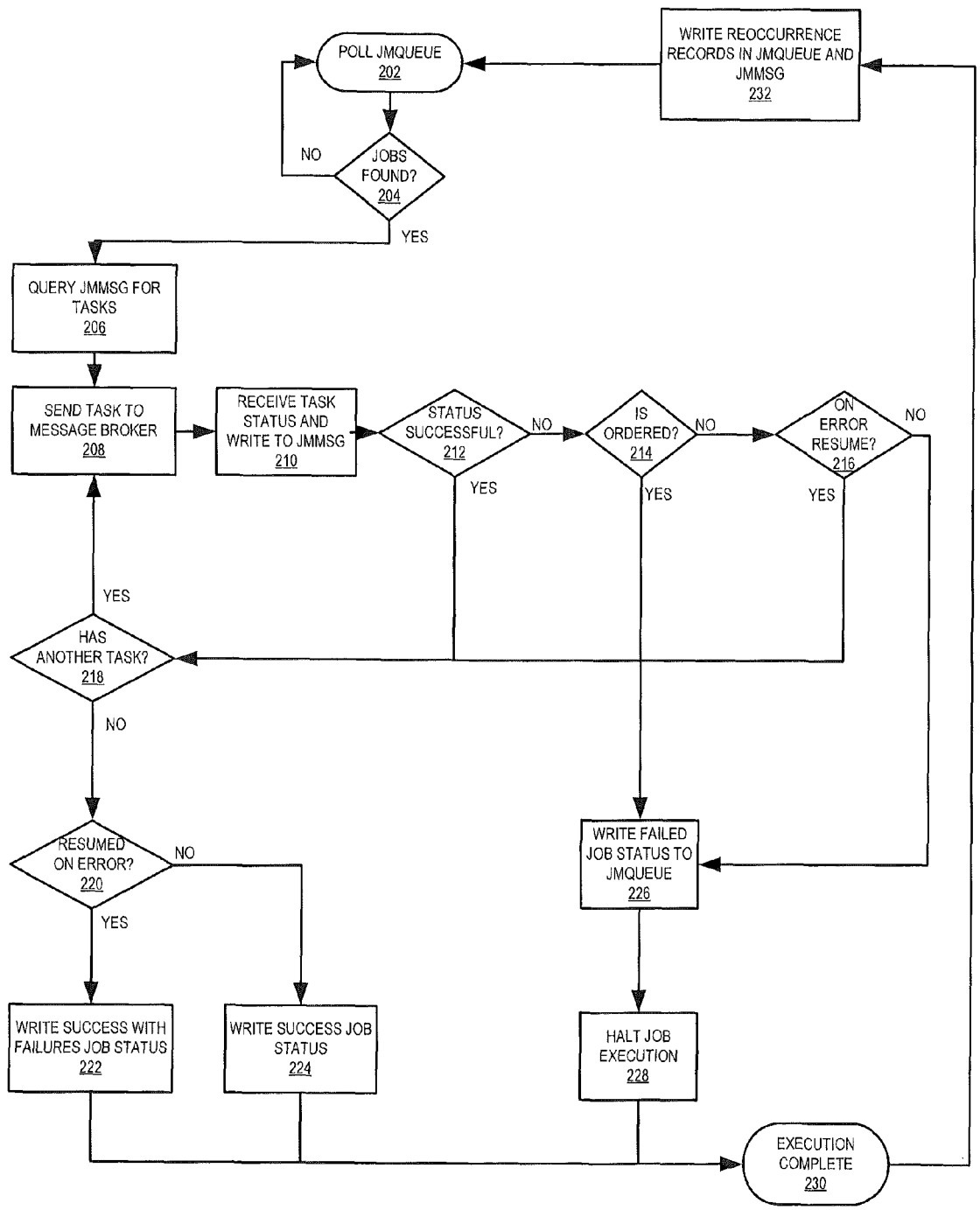
FIG. 6 is a logical flow diagram that illustrates the high-level flow of how jobs and tasks are executed by a system according to some embodiments.

FIG. 6 is a logical flow diagram that illustrates the high-level flow of how jobs and tasks are executed by a system according to some embodiments. Retry attempts, success and failure triggers are not represented in the flow diagram of FIG. 6.

Referring to FIG. 6, the job manager first polls the job message queue JMQUEUE (block 202). If no jobs are found in the queue (block 204) then the job manager continues to poll the queue. Once a job is found, the job manager queries the message table JMMSG for tasks (block 206). The next available task is then sent to the message broker (block 208). Once the task is in the LSQUEUE table, the message broker will find an available event manager and execute the task.

Next, the job manager receives a task status and writes the task status to the JMMSG queue (block 210). A check is then made to determine if the status was successful (block 212). In this step, the status is read from the LSQUEUE table once the task is been executed. If the status was successful, operations proceed to block 218 where it is determined if there is another task waiting to be executed. If so, the task is sent to the message broker at block 208, and the process repeats. If at block 212 the status of the task was determined to be unsuccessful, operations proceed to block 214 to determine if the task was ordered. If so, the job manager writes a failed job status to the JMQUEUE at block 226 and halts job execution at block 228.

If the task was not ordered, the job manager determines if it is configured for "resume on error" at block 216. If not, the job manager writes a failed job status the JMQUEUE at block 226 and halts job execution at block 228. If the job manager is configured for "resume on error", the operations proceed to block 218 to determine this there is another task in the JMMSG queue. If not, operations proceed to block 220 to determine if the job manager has resumed on a previous error. If not, operations proceed to block 224 where the job manager writes a successful job status. Otherwise, operations proceed to block 222 where the job manager writes success with failures job status. Execution of the current job is completed at block 230. After execution is complete, operations proceed to block 232 where the job manager writes reoccurrence records in the JMQUEUE and JMMSG tables. Operations of the job manager then return to block 202 to poll the JMQUEUE table.

V. System Operation

A. Connecting to an Environment

Figure 7:
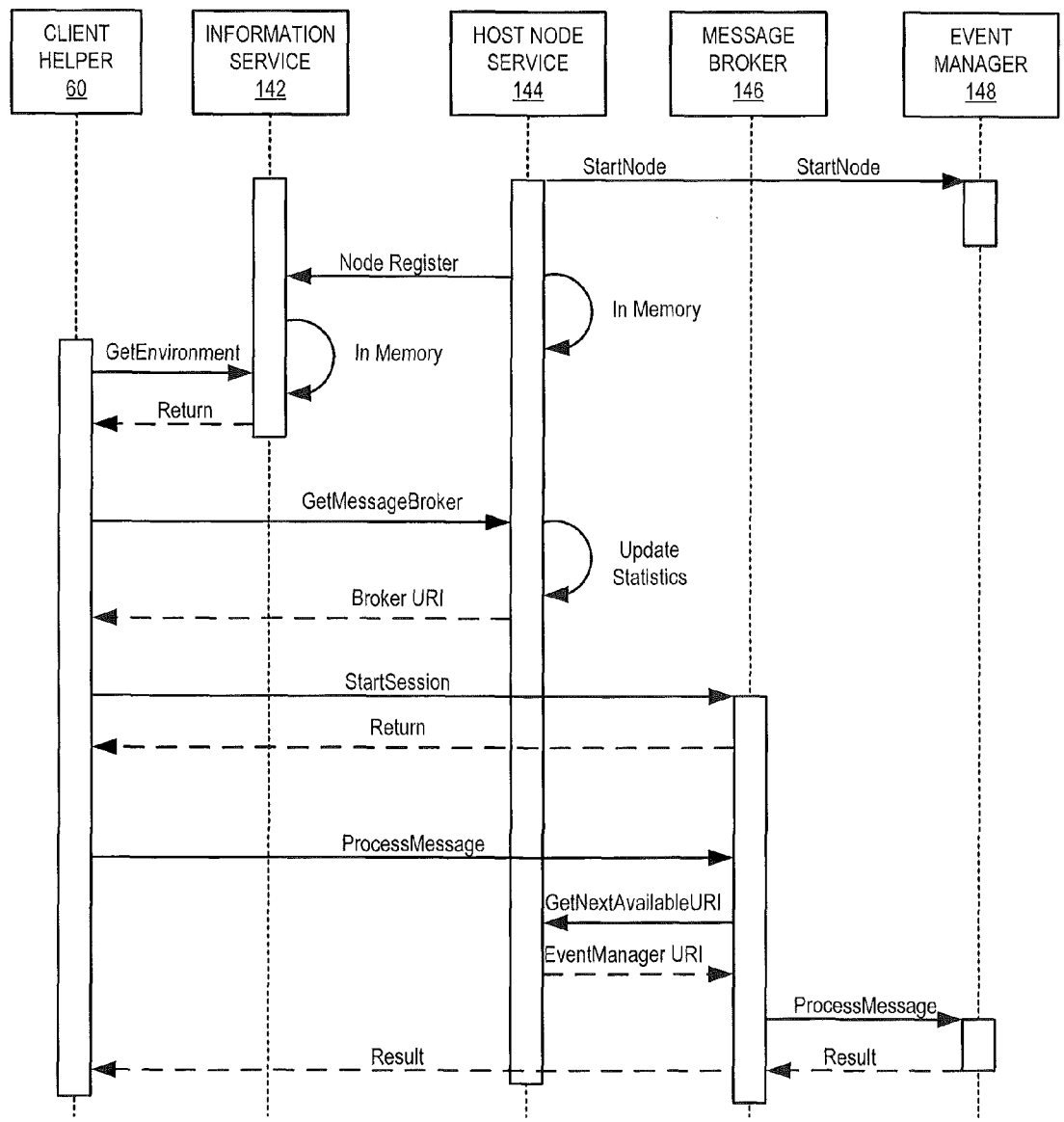
FIG. 7 is a logical flow diagram that illustrates the process of a client connecting and registering with a running an environment.

FIG. 7 is a logical flow diagram that illustrates the process of a client connecting and registering with a running environment.

Referring to FIG. 7, the host node service 144 issues a start mode command through the message broker 146 to the event manager 148. The node register information is then sent to the information service 142, which stores the node register information in memory. Upon receipt of a GetEnvironment request from the client helper 60, the information service returns the node register to the client helper 60. The client helper 60 may then issue a GetMessageBroker request to the host node service, which returns a broker URI to the client helper 60.

The client helper 60 may then issue a StartSession command to the message broker 146. Subsequently, the client helper 60 may issue a ProcessMessage command to the message broker 146. In response to the ProcessMessage command, the message broker 146 issues a GetNextAvailableURI command to the host node service 144, which returns an event manager URI to the message broker 146. The ProcessMessage command is then forwarded to the identified event manager 148 which returns a result to the message broker 146 that is forwarded back to the client helper 60.

B. Messaging Construct (LSMessage)

The present system uses a unique message construct to communicate between components. This construct is modeled after a traditional package structure that contains header information, which is used to audit and rout the message, and a payload structure used for pass data.

C. Message Persistence and Message Queuing

To support true High Availability, all messages that are routed through an environment (cluster) are persisted into a Message Queue. The Message Queue ensures that messages are successfully received and routed, even within emergency situations.

Figure 8:
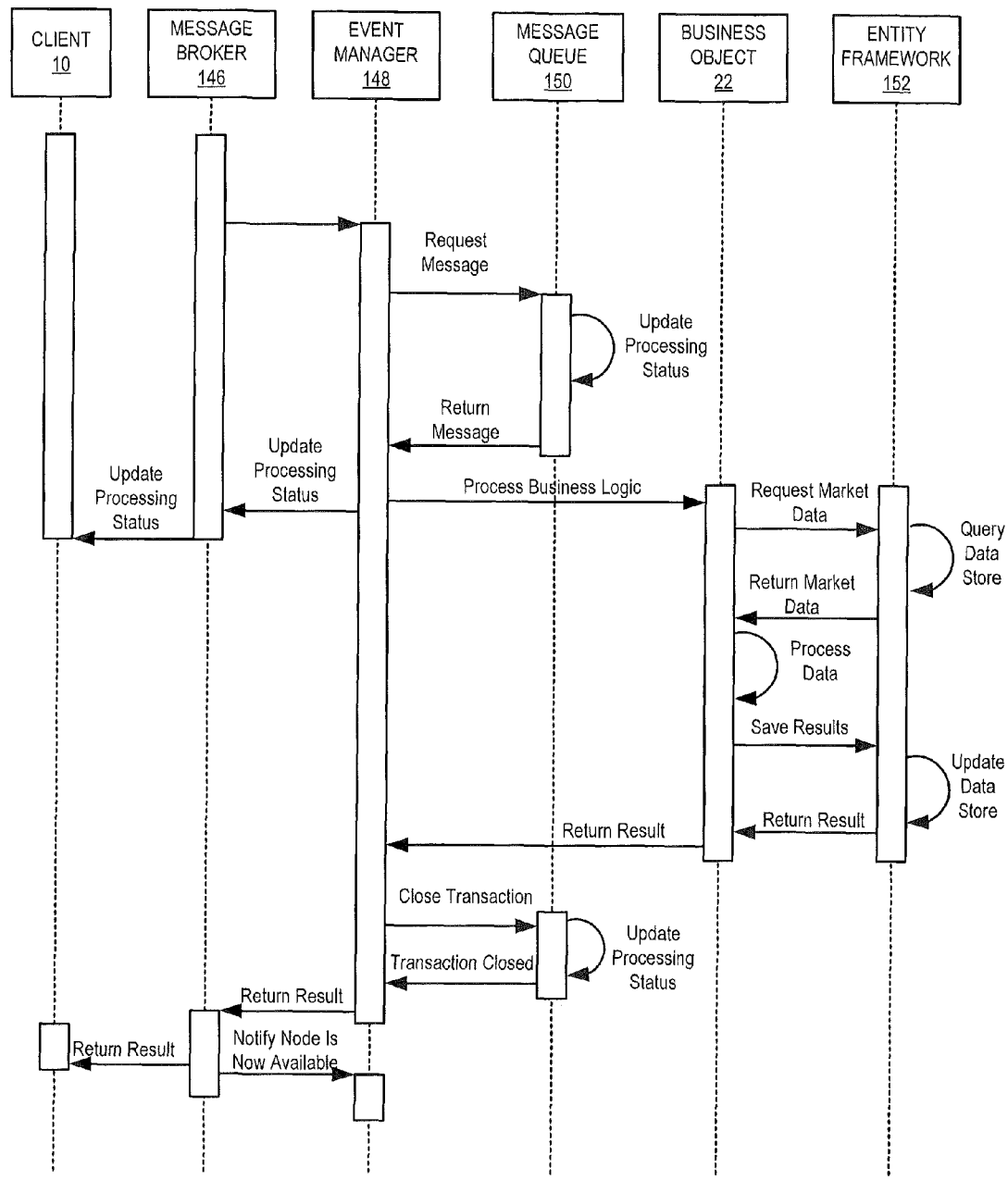
FIG. 8 is a sequence diagram that illustrates processing of a message queue.

The diagram of FIG. 8 illustrates how the system interacts with the message queue to provide guaranteed delivery to a business object.

Referring to FIG. 8, a sequence diagram for processing the message queue is issued. Upon receipt of a message in the message queue, the message broker 146 sends a message ID for processing to the event manager 148. The event manager 148 requests a copy of the message from the message queue 150, which returns the message to the event manager 148. The event manager 148 instructs the business object 22 to process the business logic in response to the message. In connection with this, the business object 22 may request market data from an entity framework and may save results in the entity framework. The business object 22 may process the data and save the results in the entity framework 152. The business object 22 returns a result to the event manager 148, which closes the transaction in the message queue and returns a result to the message broker 146. The result is then returned to the appropriate client 10.

D. Run-Time Invocation of Business Objects

The present system decouples the technology architecture and server technologies necessary to deliver an enterprise software solution from the business intelligence that drives the solution by using polymorphism and late binding when generating business objects. As is well known in the art, polymorphism is a programming feature that allows values of different data types to be handled using a uniform interface. Thus, a business object generated in the present system may be able to process different types of data using the same interfaces. Late binding is a computer programming mechanism in which the method being called upon an object is looked up by name at runtime. By using late binding, business object methods do not need to be hard coded prior to runtime.

Using these methodologies business objects are instantiated during run-time and then methods are invoked using, for example, Microsoft's .NET Reflection libraries.

To make this possible, the SDK provides a wrapper class that must be inherited by business object classes in order to be eligible for processing. This is explicitly done to achieve two objectives, namely, to ensure that the assemblies invoked by the event managers as a result of an Instruction Message are compatible business objects and to provide a common entry method for every deployed business object that accepts the system's proprietary message construct.

Within the SDK is an assembly named LSBusinessObjectWrapper. This component contains the abstract class LSBusinessObjectWrapper, which implements a proprietary interface of IBusinessObject:

The IBusinessObject interface requires all inheriting objects override the method named ProcessInstruction that accepts the system's message construct as a parameter.

The ProcessInstruction method is the common entry method for each and every business object deployed within an environment.

E. Hot Deployment and Portability

Because the present system uses late binding to instantiate business objects, the application server platform supports the hot deployment of business objects, which means the application server itself does not need to be taken down (or offline) in order to push new or updated software components to the system.

This is accomplished by putting the event manager services running on a node into a "Busy" state, which indicates the service should release and destroy all references to the business objects that may be in memory; additionally, this process sends a manual request into the system's garbage collector o release the memory space of those objects.

An unexpected benefit of this model is that that code that is developed as business objects becomes portable between different environments, different versions and possibly other software solutions. Similar cloud-based services may require assemblies to be specifically architected to run within their architecture. This means significant refactoring would need to occur should the client choose to stop using a particular service but wanted to re-use the logic in the assemblies within another solution.

F. Load Balancing and Messaging Patterns

The present system uses a messaging pattern that implements fail-over, fail-back and load-balancing logic. These functions have specific logic coded for them in the Client Helper, message broker Service, host node service and Information Service components.

The pattern uses a registration process to identify clients that are making calls through the system. Each client will be given a session upon successful connection and registration. The client will then make requests into the Information Service of any node running within an environment. The information service is running on a well-known port, so the parameters of the calls are shielded from the client and encapsulated within the Client Helper library. All that is needed is the host name and environment of at least one known-running node within the requested environment.

Figure 9:
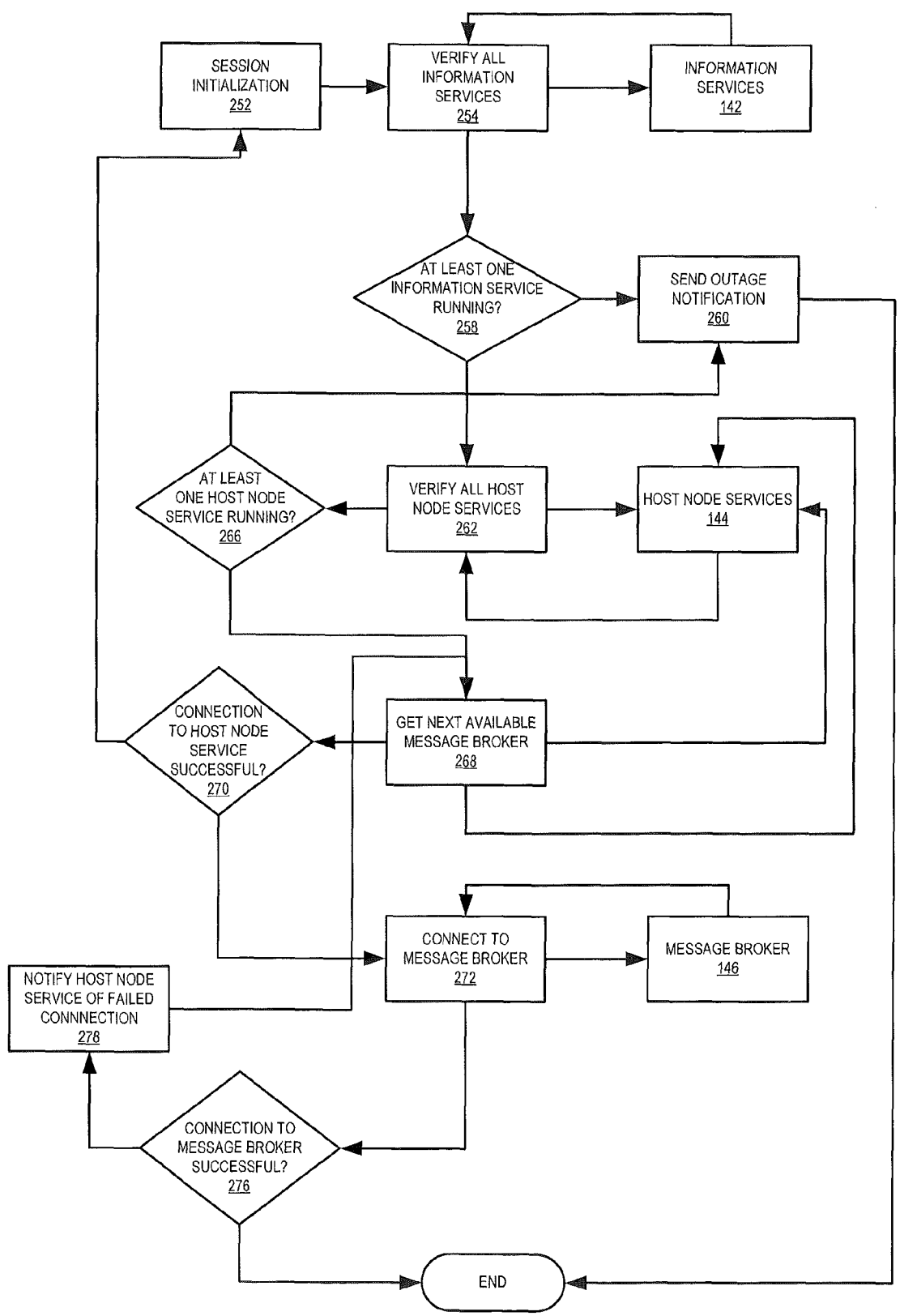
FIG. 9 illustrates a client helper process flow for connecting to a message broker.

FIG. 9 illustrates a client helper process flow for connecting to a message broker.

After session initialization at block 252 the client helper 60 verifies the information services 142. The active information services provide a host node service list to the client helper 60. After contacting the information services 142, the client helper process 60 determines if at least one information service 142 is running at block 208. If not, an outage notification is sent at block 260. If at least one information service is running the client helper process 60 then verifies that all host node services 144 are running by sending a message to the host node services 144 and receiving a return list of message brokers 146 from the host node services 144.

At block 266 it is determined if at least one host node service is running. If not, operations return to block 260 to send an outage notification. If at least one host node service is running, then the client helper process 60 gets the next available message broker at block 268. At block 270 is determined if the connection to the host node service was successful. If not, the client helper process returns to block 252 for session initialization. If a connection to a host node service was successful, the client helper process 60 connects to a message broker at block 272. The client helper process then determines if the connection to the message broker was successful (block 278), and if so, operations end. If not, the client helper process 60 notifies the host node service 144 of the failed connection, and operations return to block 268 to get the next available message broker.

G. Load Balancing

Process load balancing within the present system may not perform a round robin distribution. Instead, metrics may be used to determine which node is should receive the instruction.

The percentage of a node load is determined by the current number of processes running for the node divided by the total number of processes allowed in the configuration. The percentage is rounded to the nearest whole number for comparison. For example, a single node may continue to accept processes until the percent load reaches 1%. An example algorithm for load balancing is as follows:

```
if (_percentLoad == −1)
{
    _percentLoad = (double)_nodeData.NodeProcessCount /
    (double)_nodeData.NodeTotalProcesses * 100;
    _instance = _nodeData.NodeGuid;
}
else if (((double)_nodeData.NodeProcessCount /
(double)_nodeData.NodeTotalProcesses * 100) < _percentLoad)
{
    _percentLoad = (double)_nodeData.NodeProcessCount /
    (double)_nodeData.NodeTotalProcesses * 100;
    _instance = _nodeData.NodeGuid;
}
```

One unexpected benefit of the load balancing algorithm described above is that each node in the cluster can have a different process execution threshold. This allows for two node with different horsepower to be configured for an appropriate load based on the different processing capabilities of the hardware. For example, if server A is a 2 CPU 8 GB RAM server and server B is a single CPU 4 GB RAM server, the configuration for the process execution load that drives the load balancing can be 50 for server A and 25 for server B. This will direct twice as much traffic to server A than server B.

H. Security Model and SaaS Strategy

1. Message Security

The messaging system provides built-in secure messaging for client applications and business objects developed using the rapid application development component. In particular, the present system uses 192-bit Triple DES encryption with a proprietary 24-character length cypher key to encrypt the message construct. The payload of the message construct is also encrypted with 192-bit Triple DES encryption with a 24-character length cypher key that is created and used by both the client creating the message and the business object that would receive the message.

This combination of encryption provides security at the messaging level of the solution as well as at the data level for solution user. This is particularly valuable within SaaS delivered solutions, as the client data is encrypted and unreadable, adding to the solution offering data anonymity.

2. Software as a Service Security Strategy

Figure 10:
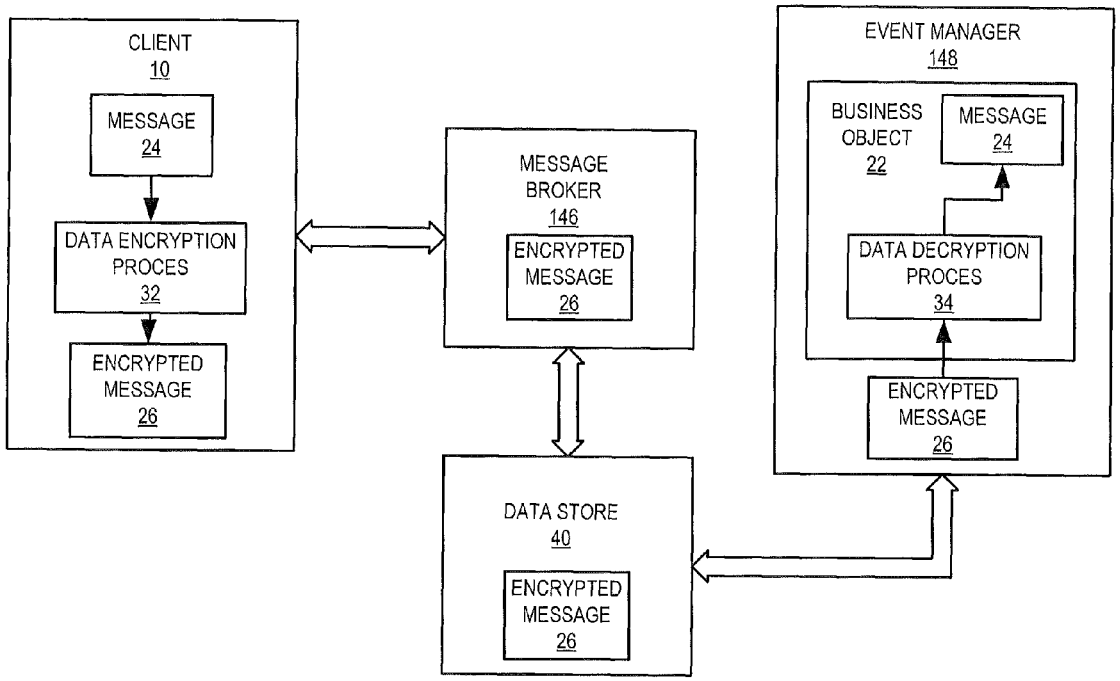
FIG. 10 illustrates the deployment of data encryption within the system according to some embodiments.

Security is an important component of the architecture which is focused on confidentiality of client information. Every aspect of the communication network between the client and the data store has a key role on the overall SaaS Security Strategy. The client applications and services require an authentication certificate to establish a communication channel to combat Phishing attacks. In addition, the present system uses proprietary data encryption algorithms to encrypt the information at the client and is decrypted in the business object component of the architecture. This approach ensures that the messages transported are confidential from end-to-end and has a high level of integrity. Man-In-The-Middle and Eavesdropping attacks can be avoided using a data encryption strategy. FIG. 10 illustrates the deployment of data encryption within the system according to some embodiments. As shown therein, the client 10 creates a message 24 that is encrypted using a data encryption process 32 in the client application to generate an encrypted message 26. The encrypted message is then transmitted over a transport channel 34 to a message broker 146. The message broker 146 stores the encrypted message 26 in the data store 40 and notifies the event manager 148 of the availability of the encrypted message. The event manager 148 then retrieves the encrypted message 26 from the data store 40 and decrypts the encrypted message 26 through a data decryption process 34 to generate the original unencrypted message 24. The data decryption process 34 may be implemented in a business object 22 or external to the business object 22.

3. Client Authentication

Depending on the requirements of individual solutions build on the architecture, users can be authenticated using a variety of mechanisms. Client authentication can be handled at the client side using Kerberos tickets or on the SaaS side using username and password credentials. A more robust approach using ADFS is also available based on the requirements of the solution.

4. Application Authentication

Client applications running on the architecture will have to provide another form of credentials separate from the client's identity. An x509 certificate for transport level security is required on the servers running the client applications that will be shipped with a solution. The certificate needs to reside in the user's Trusted People certificate store. The service endpoints for the system may not be established without a valid certificate.

5. Service Authentication

Each application within the architecture also requires an x509 certificate. Having this level of security avoids potential phishing attacks where rogue service nodes can be instantiated and configured to read messages. The service endpoints between each application may not be established without a valid certificate.

6. Application Authorization

The first level of authorization will be provided by the solution built on the architecture. Like authentication, there are several mechanisms available for client authorization. Authorization can be a broad as simply granting an authenticated user access to the entire application. However, for a more robust role-based authorization model, a solution specific business object can be implemented to grant roles to a specific part of the application. In turn, users would be assigned one or more roles. Any level of authorization can be tailored to meet the needs of the solution's requirements.

7. Message Authorization

The architecture may use a private key to encrypt the message at the client side and decrypt in the business objects. The business objects use this private key as another form of authorization. A business object cannot decrypt a message that was encrypted by another client application.

8. Transport Security and Message Security

The present system uses TCP for its message transport protocol. Security for the transport mode is provided by implementing Transport Layer Security (TLS) over TCP. The TLS implementation is provided by the operating system which handles encrypting and decrypting the message packets. The same x509 client certificate that is used for application authentication is used for TLS. The channel bindings for each application are configured for the same x509 certificate.

9. Business Object Security

The TLS contains a unique thumbprint value for each client application which will be used to secure the invocation of the business objects. The business objects for each client application are stored in a separate folder from the rest of the architecture. When the event manager processes a message, it will invoke the appropriate business object in a location determined by the Thumbprint of the client's x509 certificate.

10. Message Integrity

Within each client application is a private key for the system's proprietary data encryption algorithm. The private key is never transmitted with the message but is needed for decryption in the business objects. The solution team may identify the private key to use when developing the client application solution as well as the business objects. When the message is transported through the applications and data store that make up the architecture, the message maintains its encryption. The message is only decrypted at the time it is needed by the business objects.

11. Message Confidentiality

The client's private key helps facilitate the message confidentiality strategy, In addition, the messages stored in the message queue retain their encryption and confidentiality. Man-In-The-Middle and Eavesdropping attacks are avoided by using this specific data encryption strategy. Also, database administrators or network personnel are unable to read the content of the encrypted messages as it travels through the network or stored in the message queue database. Each solutions database can only be accessed by client applications that match the private encryption key using the same methodology as with restricting access to the business objects.

The present system supports a pluggable security model to support different security implementations. This can include role based access and control (RBAC) (provided out-of-the-box), NT Lan Manager, and Active Directory Federation Services for example, Allowing this flexibility creates a platform that allows for integration into any customer environment.

I. Publish and Subscribe Model

The system's Publish-Subscribe Capabilities may be based on the Topic-based Publish-Subscribe design pattern in the Microsoft Patterns & Practices publication, Integration Patterns. A Client (Subscriber) has the ability to subscribe in one or more Topics (Subject Lines and/or System of Origin) and only receive messages that are of interest. If a Client has subscribed for Guaranteed Delivery, all messages that were published while the client was offline will be republish when the client is back online.

Figure 11:
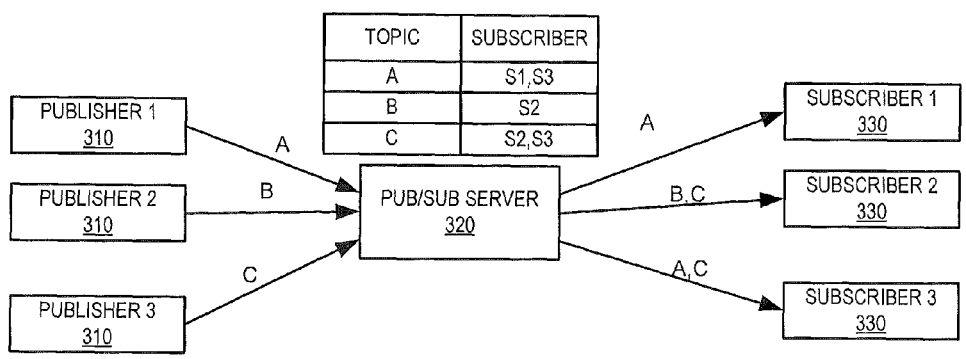
FIG. 11 illustrates a publish and subscribe model according to some embodiments.

A publish and subscribe model is illustrated in FIG. 11. In the example shown in FIG. 11, multiple publishers 310 in a publish and subscribe server system publish respective topics a, b, c to a pub/sub server 320. Each topic has an identified subscriber list stored at the pub/sub server 320. Upon receiving updates to the topics, the pub/sub server 320 checks the topic subscriber list and sends the updates to the appropriate identified subscriber 330.

The message broker services in the architecture has the role of the publisher-subscriber service. This will channel published messages through to the message broker for persistence and immediately send the messages through to the Subscribers. The message broker in turn publishes the incoming message to all message brokers in the cluster through a broker-to-broker channel, Existing high availability and failover logic will ensure that a publish-subscribe service is always available. Each message broker is responsible to publishing messages to only their own clients. The client helpers will facilitate reestablishing connections from the various publishers and subscribers on failover events.

Client Callback Channel

The client helper establishes a client callback channel when used for the publish-subscribe model. The port number and IP address of the listener must be static so the system can guarantee delivery if the client is offline while messages are being published. The publish-subscriber service uses this duplex channel to publish messages back to the client applications.

Subscription

Clients subscribing to the pub/sub messaging need to provide their unique client information along with key parameters which identify what messages need to be published to the client. The port and IP address of the client callback channel determines a unique subscriber in the system. There are two key parameters that make up the topics (Subject Line and System of Origin) that let the system know what messages to publish to specific client. In addition, the client can opt out of guaranteed delivery if needed.

During the subscription process, the client helper passes specific parameters to the subscribe methods on the publisher-subscriber service prior to calling the session initialization process on the message broker. These parameters help the system determine what message the client is subscribing to as well as delivery options.

When a client is permanently removed from using the publish-subscribe capabilities with an environment, the client must call the Unsubscribe method on the message broker. This is primarily for housekeeping of the guaranteed delivery queue information that is stored in the message queue database within the existing architecture. Unsubscribing removes all the records that are waiting for delivery by the publisher-subscriber service and removes the subscriber from any internal subscriber lists.

Subscriber List

The message brokers (Publish/Subscribe Service) will maintain multiple Subscriber Lists for the Client Callback Channels based on the message Subject Line (Topic) and System of Origin. For every combination of Subject Line and System of Origin, there will be a list which contains the address of the Client Callback Channels (Subscribers) who have interest on that message Topic.

When a new message is published the message broker will retrieve a list of Client Callback Channels that have subscribed to a specific Subject Line. A Dictionary is used to store the Subscriber Lists by topic.

When clients first connect to the message broker and run through the session initialization, the message broker reviews the Subscribers Message Queue for any undelivered messages that match the client's information J. Message Delivery Queue If a Client has subscribed to a topic and requested Guarantee Delivery, the Client Callback Channel information and Topic are stored in the database. As messages are published to the message broker from a Publisher, the message is stored in a Message Queue as it functions today. In addition, the Message Key is also stored in a Message Delivery Queue table for each subscriber and marked as undelivered. As the various message brokers deliver the message to the appropriate Client Callback Channel, the specific cross-reference record is updated with a status of Delivered. Once all subscribers have received the message, it is marked as delivered in the main Message Queue table.

Message Process Flow:

Publisher publishes a new message.

Message Persistence:

Message Broker persists message to Message Queue.

Message Broker creates all Message-Subscriber Cross-reference records in the Message Delivery Queue.

Message Delivery:

Message Broker delivers messages to its subscribers.

Message Broker updates the Cross-reference status for the specific Message-Subscriber.

Message Broker publishes message to other Message Brokers.

Message Delivery:

Message Broker delivers messages to its subscribers.

Message Broker updates the Cross-reference status for the specific Message-Subscriber.

Once the last message is delivered, the original message in the Message Queue is marked as delivered.

Figure 12:
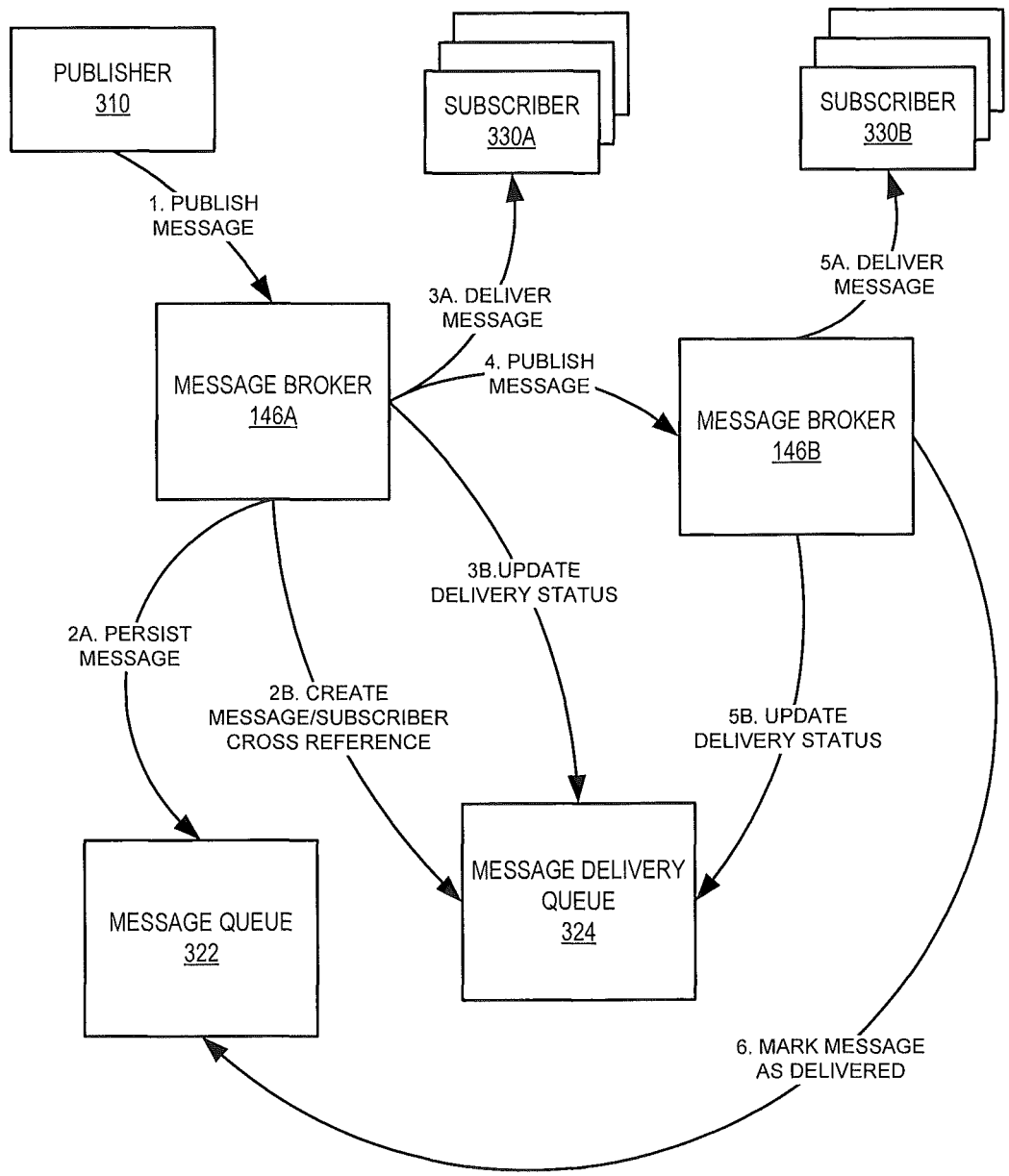
FIG. 12 illustrates publishing and delivery of messages in a publisher/subscriber message system according to some embodiments.

FIG. 12 illustrates publishing and delivery of messages in a publisher subscriber message system according to some embodiments. Referring to FIG. 12, a publisher 310 publishes a message to a first message broker 146A. The message broker 146A processes message by storing it in a message queue 322. The message broker 146A then creates a message/subscriber cross-reference and stores the message/subscriber cross-reference in a message delivery queue 324. The message broker 146A may then deliver the message to one or more local subscribers 330A and update the deliver status of the message in the message delivery queue 324. The message broker 146A may also publish the message to a second message broker 146B, which delivers the message to its local subscribers 330B and updates the delivery status in the message delivery queue 324. Finally, the second message broker 146B marks the message as delivered in the message queue 322.

K. API Design Patterns

The present system also provides functionality to software developers that assists in leveraging APIs and web services from other solutions. This adds significant value as both a solutions platform and enterprise application integration tool, as it provides the stubs and hooks solution developers would need to share data between disparate systems through industry standard APIs and Services.

Routing and Overview

For solutions requiring message routing where the contracts are known and common across the APIs, the WCF Routing Service may be used. However, since the contracts for the various APIs are unknown, a custom routing provided is required. Therefore, the message resolver and router service may be configurable and dynamic enough to integrate with any APIs and web services.

Figure 13:
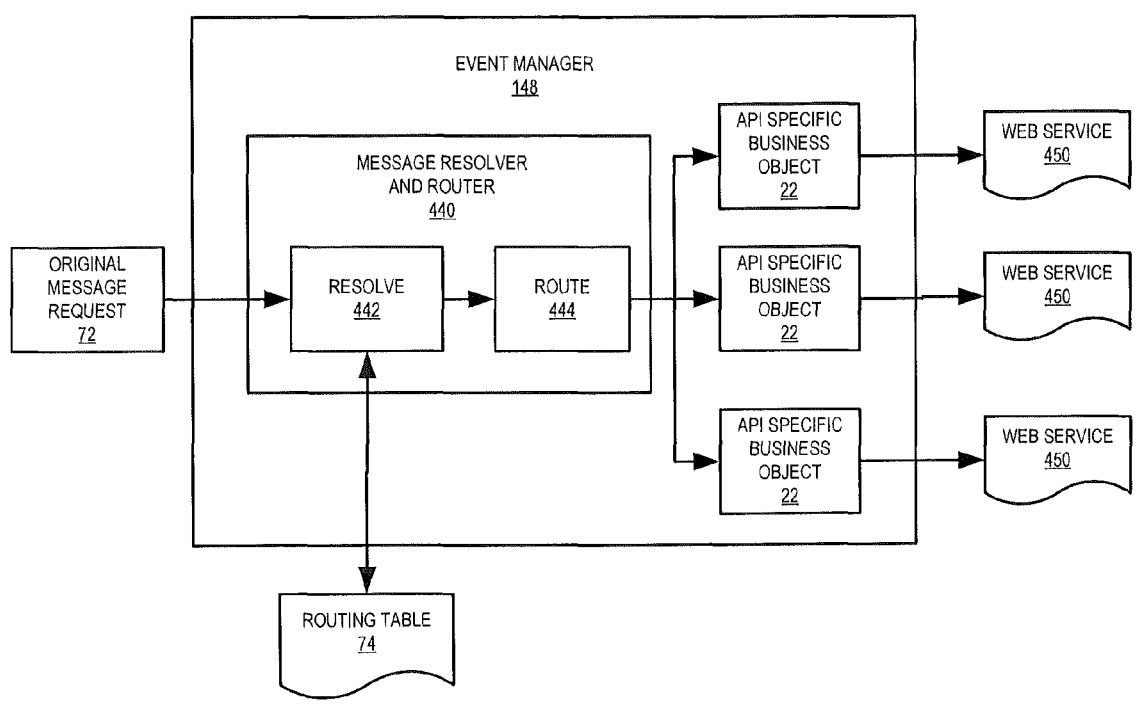
FIG. 13 illustrates the relationship of the routing table and the event manager according to some embodiments.

FIG. 13 illustrates the relationship of the routing table and the event manager. As shown therein, a message resolver and router 440 executes within the event manager 148. The message resolver and router 440 resolves message requests 72 using a routing table 74 and routes the message (block 444) according to the routing table 74 to a specified business object 22 which processes the request using one or more web services 450.

Routing may be driven by a static configuration using a routing table format of Key/Assembly pairs and a new destination URI for the web service call. APIs can be added, removed, or modified while the system is running without the need to redeploy libraries. In addition, integration with different versions of the API could be managed by designing versioning into the service.

A message resolver and router assembly will determine the context and API of the message payload. This is a wrapper assembly containing the object instantiated by the event manager. One of the two key behaviors of the message resolver is to inspect the API property of the message object and resolve it to a specific routing table entry. A sample original message is illustrated in Table 2 below.

TABLE 2

Sample Message
Original Sample Message

| API | ERCOTAPI |
|---|---|
| Destination | SQL Connection String |
| BusinessObject | LSMessageResolverRouter |
| Instruction | [EIP Action] ex. getBidSet |
| Payload | <xml>...... |

The message resolver and router assembly is also configured to dynamically load the assembly name from the routing table based on the resolution of the original API. The router replaces the original API value with a new values form the routing table containing the URI of the web service. A sample routed message is illustrated in Table 3.

TABLE 3

Routed Sample Message
Routed Sample Message

| API | https://ercot.org/apis |
|---|---|
| Destination | SQL Connection String |
| BusinessObject | PO.ERCOTAPI.DLL |
| Instruction | [EIP Action] ex. getBidSet |
| Payload | <xml>...... |

API Specific Business Objects

The business objects that invoke the APIs contain the capabilities to consume the service endpoint based on the destination URI. No shared code will be abstracted back to the Architecture. This will allow for greater flexibility for integrating with legacy COM APIs and web service endpoints. The single purpose pattern is followed by having a single business object for each API or web service integrated.

The single purpose pattern is followed where there is an assembly for inspecting the message to resolve a new destination for routing. In addition, each web service has its own assembly. The message resolver and router is very lightweight and only has two simple behaviors. All the complex code may be contained within the API specific business objects.

In the drawings and specification, there have been disclosed typical embodiments and, although specific terms are employed, they are used in a generic and descriptive sense only and not for purposes of limitation, the scope of the inventive concepts being set forth in the following claims.

What is claimed is:

1. An integrated software development and deployment architecture including an application server with a processor and memory, the integrated software development and deployment architecture comprising:

an application server component that implements business intelligence in the form of executable business objects that provide services to client applications;

a messaging component that is configured to provide messaging services between the application server component and the client applications; and a rapid application development component that is configured to enable development of both client applications and business objects that are pre-configured to communicate using the messaging component;

wherein the application server component comprises (a) an information service that communicates with the client applications and is configured to collect and distribute information regarding a condition of the host node, (b) a host node service that communicates with the information service and manages operations of a host node on which the business objects are executed and that is configured to control clustering of nodes into an environment, (c) a message broker service configured to process both messages transmitted between business objects and client applications and messages transmitted between host nodes; (d) an event manager service configured to control operation of the business objects in response to messages processed by the message broker service, wherein the event manager service is configured to provide support for hot deployment of business objects by being placed into a "busy" state, which indicates the service should release and destroy all references to business objects that are in memory and for a system garbage collector to release memory space of the released business objects; (e) a job manager service configured to manage execution of jobs by a business object in the host node; and (f) a job queue database that tracks active jobs being executed in a cluster of host nodes within an environment and that are managed by the job manager service within the environment;

wherein the message broker service provides a single endpoint for all interactions in the application server component including data communications between the information service, the event manager service, the job manager service, and the host node service in addition to client messaging; and wherein the message broker service is further configured to implement load balancing among application server components; and wherein load balancing is performed by assigning jobs to processing nodes based on both percentage loads and process execution thresholds of the processing nodes, wherein different ones of the processing nodes have different process execution thresholds.

2. The integrated software development and deployment architecture of claim 1, wherein the message broker service is configured to receive a message from an endpoint, to store the received message in a persistent data store, and to create a message delivery queue entry in response to receiving the message, wherein the message delivery queue entry identifies an intended recipient of the message.

3. The integrated software development and deployment architecture of claim 2, wherein the message broker service is configured to determine if the message is intended for a local recipient that is in a same environment as the message broker or if the message is intended for a remote recipient that is in a different environment than the message broker, to notify the intended recipient of the message in response to determining that the intended recipient is in the same environment as the message broker, and to publish the message to a remote message broker service in response to determining that the intended recipient is in the different environment.

4. The integrated software development and deployment architecture of claim 1, wherein the message broker service is configured to operate in a publish/subscribe model.

5. The integrated software development and deployment architecture of claim 1, wherein the business objects are implemented using polymorphism and late binding.

6. The integrated software development and deployment architecture of claim 1, wherein the messaging component provides built-in secure messaging for client applications and business objects developed using the rapid application development component.

7. A computer program product for providing an integrated software development and deployment architecture, the computer program product comprising:
a non-transitory computer readable storage medium having computer readable program code embodied in the medium, the computer readable program code comprising:
computer readable application server program code configured to provide an application server component that implements business intelligence in the form of executable business objects that provide services to client applications;
computer readable messaging program code that is configured to provide messaging services between the application server component and the client applications; and
computer readable rapid application development program code that is configured to enable development of both client applications and business objects that are pre-configured to communicate using the messaging component;
wherein the application server component comprises (a) an information service that communicates with the client applications and is configured to collect and distribute information regarding a condition of the host node, (b) a host node service that communicates with the information service and manages operations of a host node on which the business objects are executed and that is configured to control clustering of nodes into an environment, (c) a message broker service configured to process messages transmitted between business objects and client applications and messages transmitted between host nodes; (d) an event manager service configured to control operation of the business objects in response to messages processed by the message broker service, wherein the event manager service is configured to provide support for hot deployment of business objects by being placed into a "busy" state, which indicates the service should release and destroy all references to business objects that are in memory and for a system garbage collector to release memory space of the released business objects; (e) a job manager service configured to manage execution of jobs by a business object in the host node; and (f) a job queue database that tracks active jobs being executed in a cluster of host nodes within an environment and that are managed by the job manager service within the environment;
wherein the message broker service provides a single endpoint for all interactions in the application server component including data communications between the information service, the event manager service, the job manager service, and the host node service in addition to client messaging: and
wherein the message broker service is further configured to implement load balancing among application server components, and wherein load balancing is performed by assigning jobs to processing nodes based on both percentage loads and process execution thresholds of the processing nodes, wherein different ones of the processing nodes have different process execution thresholds.

8. The computer program product of claim 7, wherein the message broker service is configured to receive a message from an endpoint, to store the received message in a persistent data store, and to create a message delivery queue entry in response to receiving the message, wherein the message delivery queue entry identifies an intended recipient of the message.

9. The computer program product of claim 8, wherein the message broker service is configured to determine if the message is intended for a local recipient that is in a same environment as the message broker or if the message is intended for a remote recipient that is in a different environment than the message broker, to notify the intended recipient of the message in response to determining that the intended recipient is in the same environment as the message broker, and to publish the message to a remote message broker service in response to determining that the intended recipient is in the different environment.

10. The computer program product of claim 7, wherein the message broker service is configured to operate in a publish/subscribe model.

11. The computer program product of claim 7,
wherein the job manager service is configured to monitor the job queue database for notification of failure of another node within the cluster and to take over execution of a job that was managed by the failed node.

12. The computer program product of claim 7, wherein the business objects are implemented using polymorphism and late binding.

13. The computer program product of claim 7, wherein the computer readable messaging program code that is configured to provide messaging services between the application server component and the client applications provides built-in secure messaging for client applications and business objects developed using the rapid application development component.

* * * * *